March 9, 1926.
C. S. HARRIS
CUTTER
Filed Dec. 26, 1923
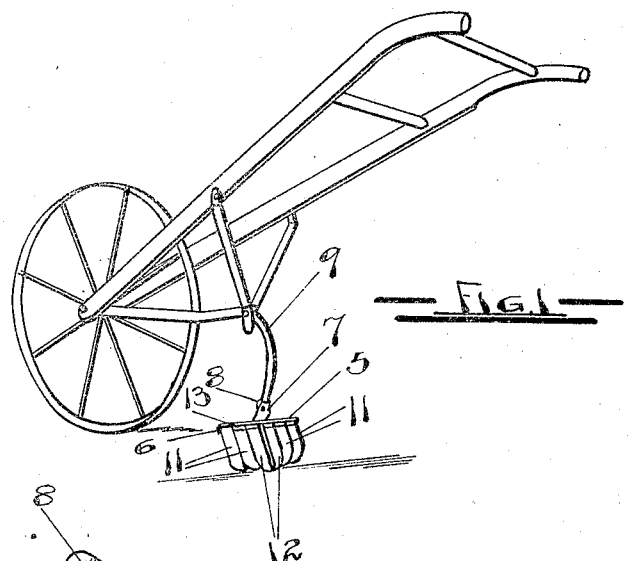
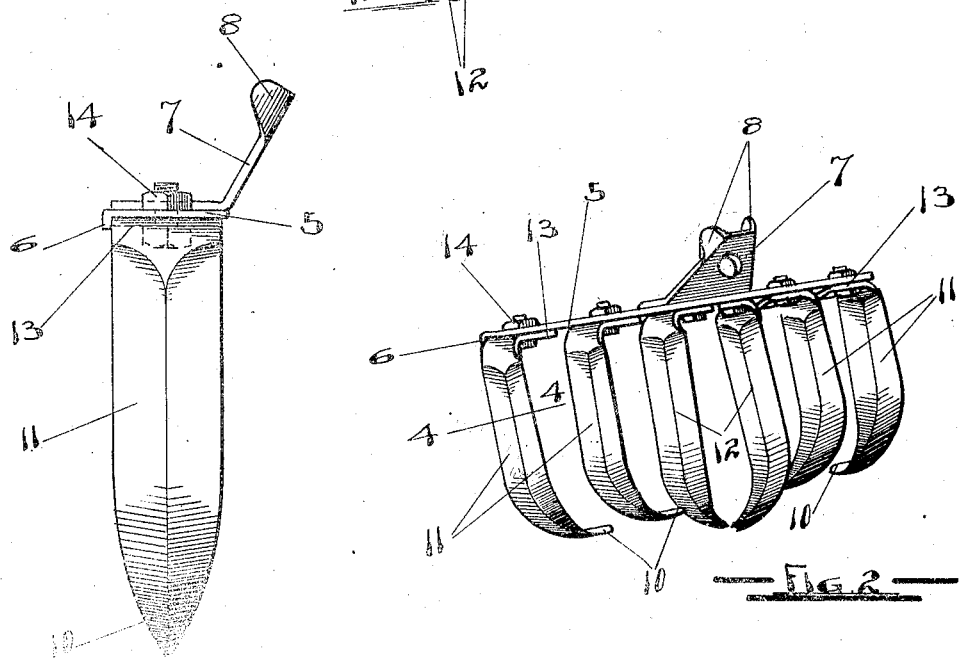
INVENTOR
CLESSON S. HARRIS
BY C. J. Blake
ATTY.

Patented Mar. 9, 1926.

1,575,756

UNITED STATES PATENT OFFICE.

CLESSON S. HARRIS, OF NEWBERG, OREGON.

CUTTER.

Application filed December 26, 1923. Serial No. 682,697.

*To all whom it may concern:*

Be it known that I, CLESSON S. HARRIS, a citizen of the United States, residing at Newberg, county of Yamhill, State of Oregon, have invented certain new and useful Improvements in Cutters, of which the following is a specification.

My invention relates to cutters in general, and particularly to cutters used upon garden implements, the object being to provide cutters for such an implement that will leave a superior dust mulch, that will present a substantially continuous horizontal cutting edge that will not allow weeds to pass through between the knives, that has a plurality of substantially vertical cutting edges for making a dust mulch, and that has features hereinafter to be described that render the implement easily guided in a straight line.

I accomplish the above objects by means of the construction illustrated in the accompanying drawing, which is a part of this application for Letters Patent, like characters of reference indicating like parts throughout the several views thereof, and in which:

Fig. 1 is a perspective view of a garden implement with my device attached thereto.

Fig. 2 is a perspective view upon an enlarged scale of my device detached from the implement.

Fig. 3 is an end elevation of my device upon a further enlarged scale.

Fig. 4 is a section upon line 4—4 of Fig. 2, drawn upon an enlarged scale.

In general my device consists of a cross bar securable upon a garden implement and depending therefrom a plurality of doubled edged knives having centrally curved extremities, the point of each knife overlapping the body of the adjacent knife so as to form altogether a substantially continuous horizontal cutting edge, and the two adjacent central knives projecting below the other knives for purposes of guiding the implement as hereinafter described.

The cross bar 5 is provided with a downward turned edge 6 against which edge the upper ends of the knives may abut, thus necessitating only one bolt to hold each knife upon the cross bar in a secure position. A clip 7 is provided for securing said cross bar upon the implement, said clip being secured to the cross bar by the bolts that secure the central knives thereto, and being also provided with suitable ears 8 to embrace the hanger 9 of the implement.

The knives are ground as shown in Fig. 4, with a central enlarged portion tapering towards each sharpened edge, thus providing clearance for the knife as it passes through the ground, and resulting in an easily propelled device. The lower end of each knife is curved towards the center of the device, the termination being substantially horizontal, as shown at 10 in Fig. 2 for the knives 11. The central knives 12 are also thus curved at their lower ends, and are longer than the knives 11, as shown in Figs. 1 and 2. The object of extending the knives 12 below the knives 11 is to provide a means of easily keeping the implement in a straight line, especially when taking a very shallow cut with the knives 11 as when cutting very close to small plants. The knives 12 projecting into the ground at such times provide a sideways bearing upon the ground that would not be obtained with the knives 11 and thus present resistance to sidewise swing of the device, and furthermore, because said knives 12 project into the ground in a line immediately behind and in line with the implement wheel they serve the purpose of assisting in guiding the implement in a straight line. This is important when cultivating small plants such as onions and the like.

The point 10 of each knife is carried sufficiently close to the adjacent knife so that it overlaps the cutting edge of the body of the latter, as shown in Fig. 2, and thus is secured a substantially continuous cutting edge that is the equivalent of a solid horizontal cutting edge, because no weeds can pass through between the knives uncut.

Each knife is provided with a turned portion 13 that abuts against the edge 6 of the cross bar, and is secured to said cross bar by suitable bolts 14, the bolts for the central knives 12 also securing the clip 7 to the cross bar 5.

By reason of the substantially continuous horizontal cutting edge this device will do the work of the usual solid horizontal weed cutting knife, and by reason of the vertical cutting portions of each knife it will do the work of the usual cultivator teeth, and it will do the work of these usually separately used devices simultaneously, cutting the weeds and cultivating and dust mulching at one operation.

My device may be made of any size, and constructed of any materials deemed convenient and suitable for a device of this character, and while I have illustrated and described a form of construction found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new, and desire to secure by Letters Patent is:

1. In a cutter: a cross bar; a plurality of double-edged cutter knives secured thereto and depending therefrom; centrally directed curved lower extremities upon said knives; a pair of centrally disposed knives similar to said former knives but extending below the same; and a clip for securing said cross bar upon an implement.

2. In a cutter: a transversely disposed cross bar; double edged knives mounted upon said cross bar and depending therefrom; transversely curved extremities upon each knife, the extremity of each knife extending beneath the curved extremity of an adjacent knife to form with said adjacent knife a substantially horizontal cutting edge; a centrally disposed pair of knives with their curved extremities pointing towards each other and positioned below the extremities of said former knives; all of said knives being reversible upon said cross bar.

In witness whereof I claim the foregoing as my own I hereunto affix my signature at Newberg, county of Yamhill, State of Oregon, this 5th day of Nov. 1923.

CLESSON S. HARRIS.